(12) United States Patent
Mac

(10) Patent No.: US 7,992,918 B2
(45) Date of Patent: Aug. 9, 2011

(54) AUTOMOBILE 2 PARALLEL ROWS VISOR

(76) Inventor: Tony Mintung Mac, San Francisco, CA (US)

(*) Notice: Subject to any disclaimer, the term of this patent is extended or adjusted under 35 U.S.C. 154(b) by 85 days.

(21) Appl. No.: 12/589,811

(22) Filed: Oct. 29, 2009

(65) Prior Publication Data

US 2011/0101725 A1    May 5, 2011

(51) Int. Cl.
*B60J 3/02* (2006.01)
(52) U.S. Cl. ............... 296/97.9; 296/97.2; 296/97.13
(58) Field of Classification Search ............ 296/97.1, 296/97.2, 97.9, 97.12, 97.13
See application file for complete search history.

(56) References Cited

U.S. PATENT DOCUMENTS

| | | | | |
|---|---|---|---|---|
| 2,261,881 A * | 11/1941 | Horstmann | ................. | 296/97.6 |
| 2,681,824 A * | 6/1954 | Knoblock | ................. | 296/97.9 |
| 2,823,950 A * | 2/1958 | Harris | ................. | 296/97.6 |
| 3,201,170 A * | 8/1965 | Weingarten | ................. | 296/97.6 |
| 3,472,549 A * | 10/1969 | Wiesmann | ................. | 296/97.9 |
| 3,556,585 A * | 1/1971 | Binder | ................. | 296/97.12 |
| 4,666,205 A * | 5/1987 | Nakagawa | ................. | 296/97.6 |
| 4,681,363 A * | 7/1987 | Hemmeke et al. | ................. | 296/97.11 |
| 4,690,450 A * | 9/1987 | Boerema et al. | ................. | 296/97.9 |
| 4,821,374 A * | 4/1989 | Gavagan | ................. | 16/321 |
| 5,031,953 A * | 7/1991 | Miller | ................. | 296/97.9 |
| 5,213,389 A * | 5/1993 | Loftis et al. | ................. | 296/97.7 |
| 5,316,362 A * | 5/1994 | McGuinness | ................. | 296/97.9 |
| 5,533,776 A * | 7/1996 | Agro et al. | ................. | 296/97.9 |
| 5,765,897 A * | 6/1998 | Snyder et al. | ................. | 296/97.9 |
| 5,816,642 A * | 10/1998 | Wilson | ................. | 296/97.9 |
| 5,902,002 A * | 5/1999 | Wilson | ................. | 296/97.13 |
| 6,068,323 A * | 5/2000 | Brown et al. | ................. | 296/97.9 |
| 6,106,048 A * | 8/2000 | Wright | ................. | 296/97.13 |
| 6,290,280 B1 * | 9/2001 | Riekse | ................. | 296/97.6 |
| 6,328,371 B1 * | 12/2001 | Mac | ................. | 296/97.13 |
| 6,776,446 B1 * | 8/2004 | Tutt | ................. | 296/97.11 |
| 2009/0058125 A1 * | 3/2009 | Mac | ................. | 296/97.2 |

* cited by examiner

*Primary Examiner* — Glenn Dayoan
*Assistant Examiner* — Gregory Blankenship

(57) ABSTRACT

In daily driving one is constant bombarded with distractions. Falling victim to the blinding sunlight can be one, such outcome that can lead to a disastrous of car accident. My invention will provide drivers and passengers added security by adding a transparent light color visor to the original car visor thus shielding the user from unwanted light. this is accomplished by employing two parallel rows visor, the first row which uses the transparent light color visor, the second row which is the existing factory visor, the two row of visors will use the existing mounting bracket along with a bracket adapter to mounted it the two rows visor may overlap each other and be used separately at various position to shield the eyes of the automobile driver and passenger.

3 Claims, 7 Drawing Sheets

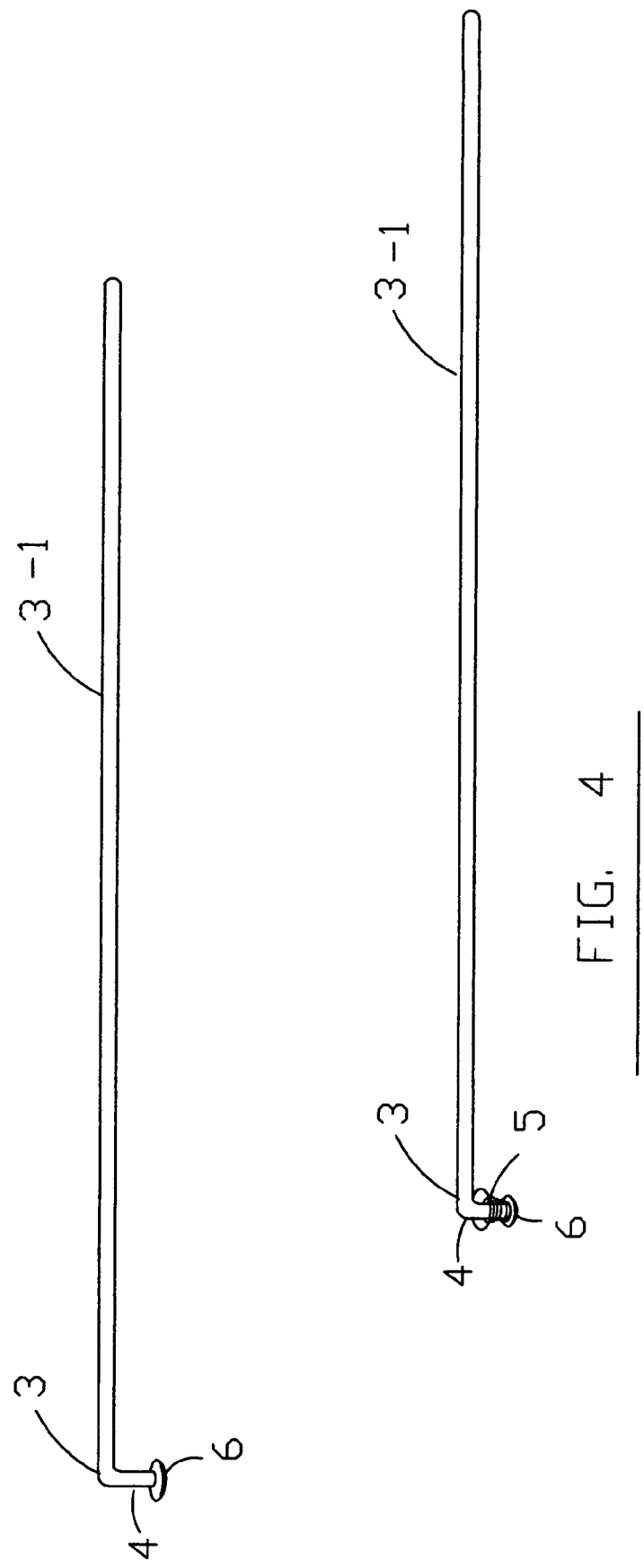

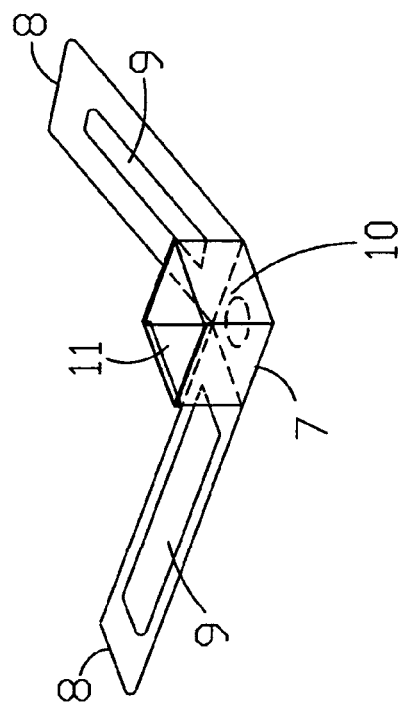
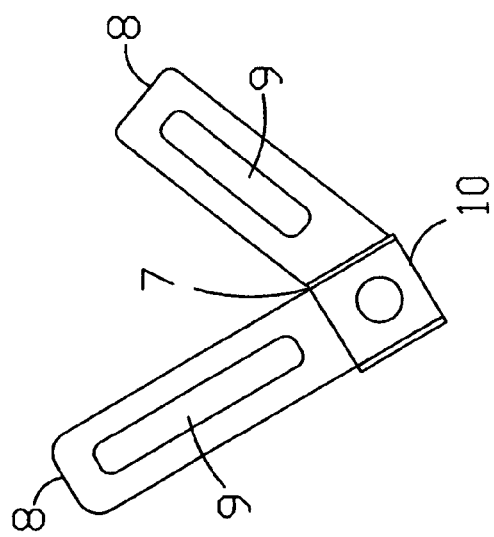
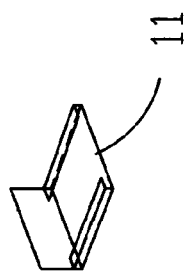
FIG. 7
FIG. 8
FIG. 9

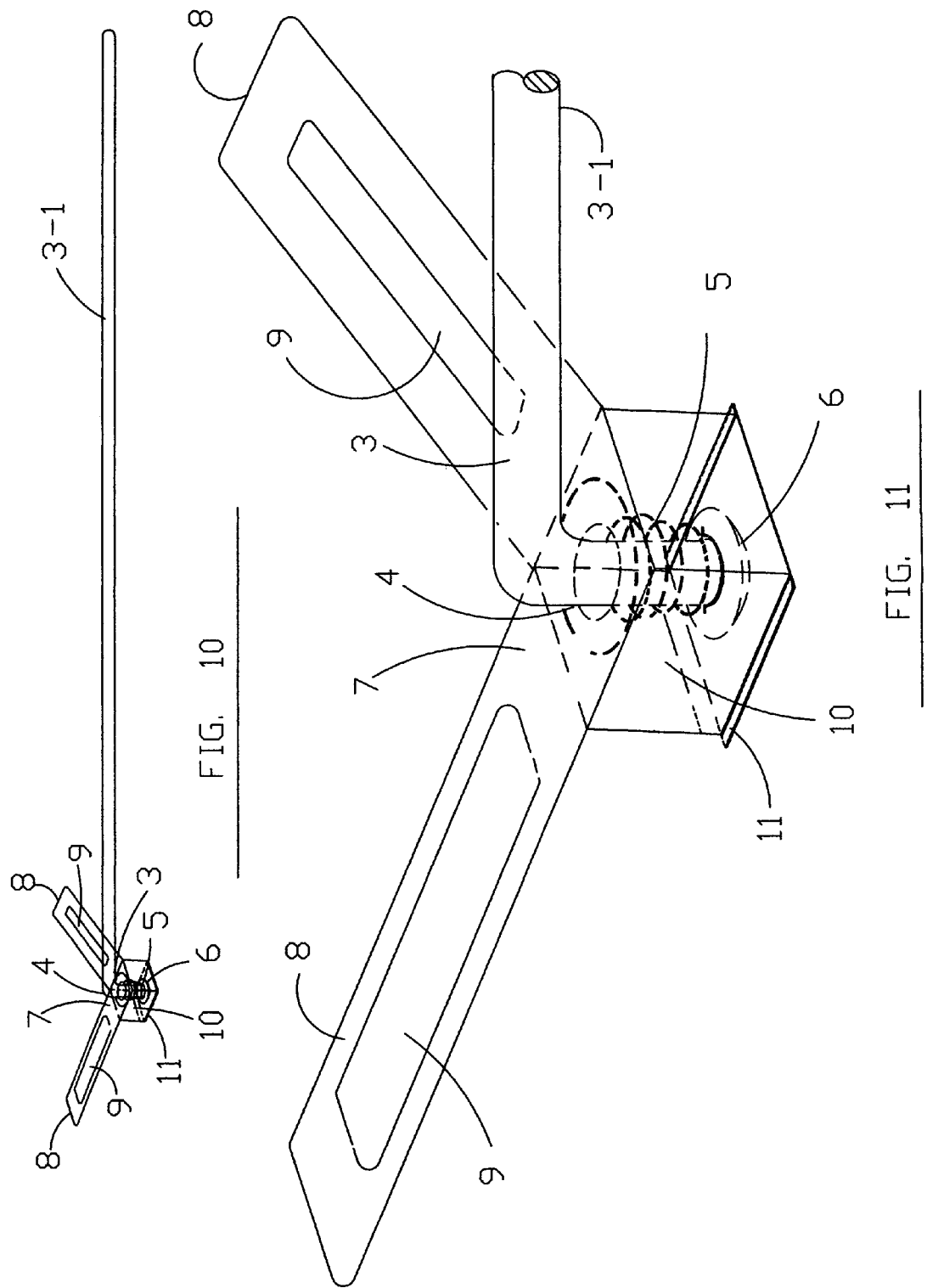

AUTOMOBILE 2 PARALLEL ROWS VISOR

BACKGROUND OF THE INVENTION

This invention relates to my original U.S. Pat. No. 6,328, 371 B1. vehicle sun visor. Because divisional personal drive custom demand and automobile manufacture after market sale convention. By adding another layer similar sized elongated light color transparency panel at the existing original automobile visor's mounting bracket to make a double rows automobile visor this light color transparency panel permit the necessary variation in light required for day and night to shield the eyes of car operator or passenger from oncoming and sides of automobile headlights or sun rays. It is obvious that each panel can be used independently to permitting adjustments to suit one's viewing needs.

SUMMARY OF THE INVENTION

In accordance with the invention, the automobile has two parallel rows of visor panels. The first row visor is an elongated light color transparency panel. the second row visor is the existing automobile visor panel. the colored transparency panel is then attached to a slotted spring sleeve adhering by epoxy glue. said panel is clamped at an up turn end of the visor support rod securely but yet permits said panel to be adjusted to suit viewing needs and mounted at the top of the existing original visor bracket . It is obvious that each visor panel can be used independently during day or night for driver and passenger to suit their viewing needs.

BRIEF DESCRIPTION OF THE DRAWING

Further objects and advantages of the invention will become apparent from the following description and claims and from the accompanying drawing, wherein:

FIG. 4 is a perspective view of the visor support rod.

FIG. 7 is a top view of automobile visor bracket adaptor.

FIG. 8 is a bottom view of automobile visor bracket adaptor.

FIG. 9 is a perspective view of automobile visor bracket adaptor open box's cover.

FIG. 10 are a combination view of automobile visor comprise bracket adaptor with open box, visor support rod and the compression spring.

FIG. 11 is a enlarged view for the combination of the automobile visor's bracket adaptor with open box, support rod and the compression spring.

DETAILED DESCRIPTION OF THE PREFERRED EMBODIMENT

Figure 1:
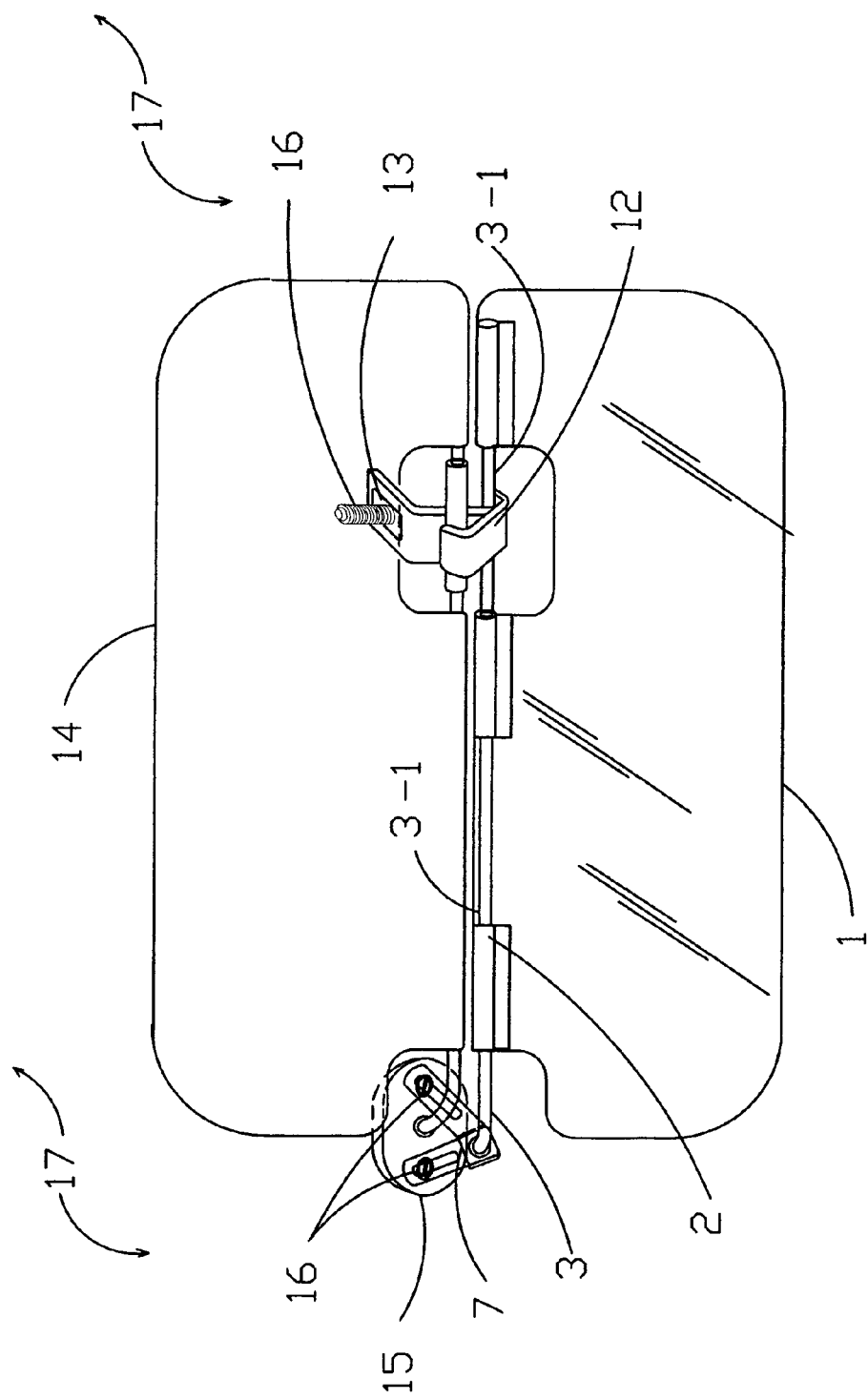
FIG. 1 is a perspective view of the automobile 2 parallel rows visor of present invention.
Figure 2:
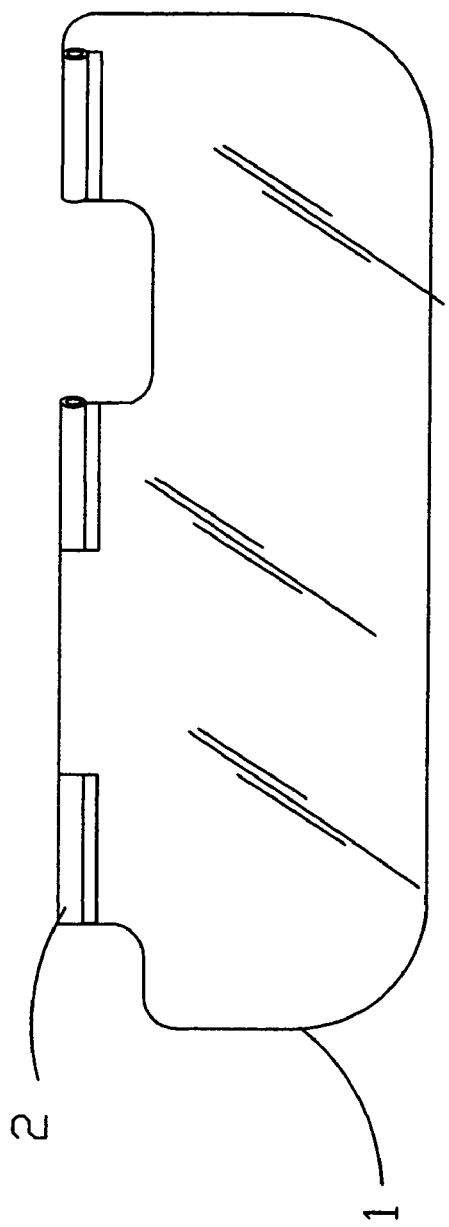
FIG. 2 and FIG. 3 are front and side views of an improved light color transparency panel and the attached slotted spring sleeve adhered by epoxy glue.
Figure 3:
Figure 6:
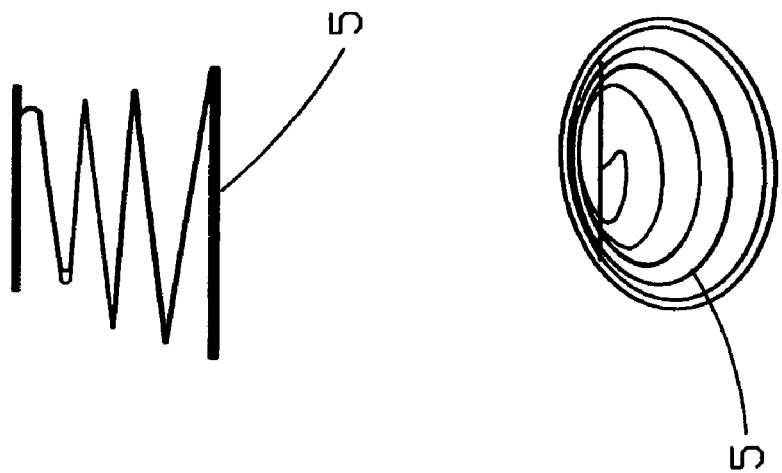
FIG. 6 is enlarged views of a compression holding spring.
Figure 5:
FIG. 5 is top and side views. respectively of a compression holding spring.
Figures 12, 13:
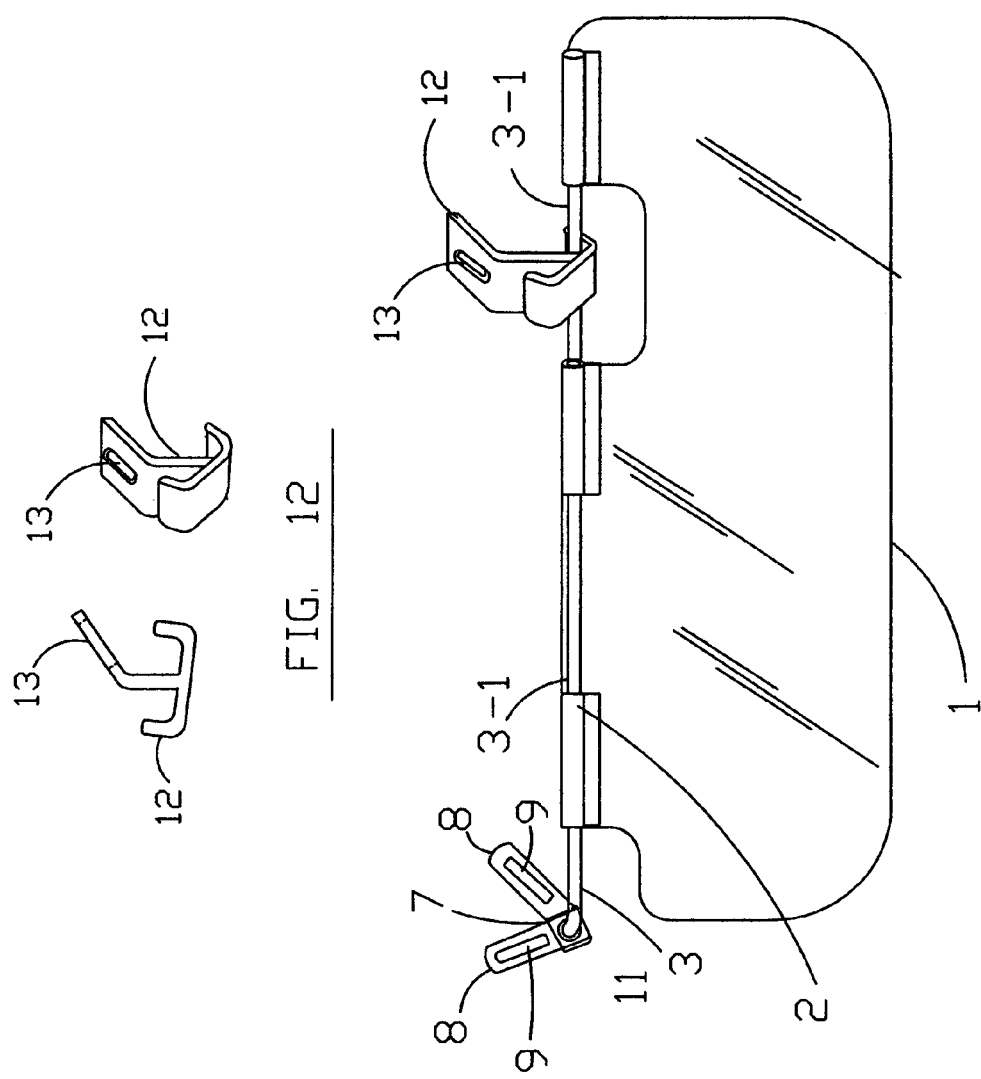
FIG. 12 is a perspective view of a visor hanger.
FIG. 13 is a perspective view of the relationship between the automobile visor's transparency panel, slotted spring sleeve, support rod and bracket adaptor.

Referring now to the drawing in detail, wherein like numerals indicate like elements throughout the several views. FIG. 1, The automobile visor properly consists of two panels. The numeral 1 designates the automobile visor light color transparency panel. The numeral 14 designates the existing original automobile visor panel. panel 1 is longer than panel 14 to permit pulling down one or both panel at a time. Panel 1 is attached on a slotted spring sleeve 2 by a strong adhering substance such as epoxy glue see FIG. 2 and FIG. 3. The slotted spring sleeve 2 clamped at an up turned end to the automobile visor support rod 3 whereby the slotted spring sleeve 2 is held in a friction grip on the visor support rod 3 securely, yet permits the panel 1 to be operated by hand at the desired position and remain in place after that position has been determined to shield the eyes of driver and passenger from sun's rays and oncoming car's headlights. The numeral 3 designates automobile visor support rod see FIG. 4 has a short right angle bar 4 with a head 6 and attached a compression spring 5. The numeral 7 designates automobile visor mounting bracket adapter. It's fabricated into a "Y" shape, FIG. 7, FIG. 8, FIG. 10 and FIG. 11, adapter has two flat scraper 8 both scraper have an elongated groove 9, at one end for mounting to of existing car's visor bracket 15, and have two thread screws 16 extending through the bracket base for securement to the car 17. The automobile visor bracket adapter 7 at lower portion constituted to an open bottom box 10 and a box cover 11. The box's height should be half of the automobile visor support rod short right angle 4. To attach, insert the short right angle bar 4 of visor support rod into visor bracket adapter 7 from open bottom box 10 and locked it by box cover 11. Automobile visor support rod 3 has a longer part 3-2 which penetrates; through the slotted spring sleeve 2 and hang at visor hanger 12 see FIG. 1, FIG. 10 and FIG. 13.

The numerals 12 designate automobile visor hanger. The visor hanger has an anchor shape with an elongated groove 13, see FIG. 1, FIG.12 and FIG. 13, having a thread screw 16 extending through hanger base thereof secure to the automobile 17.

I claim:

1. An automobile visor system comprising:

a first automobile visor that is a tinted, transparent panel;

a first visor support rod formed by a first short support rod joined at one end to a first long support rod at an angle that is substantially perpendicular, wherein the first short support rod has a head opposite the end joined to the first long support rod, wherein the head has a compression spring;

the first automobile visor is attached to the first long support rod by several slotted spring sleeves, each slotted spring sleeve receives a portion of the first long support rod, the first automobile visor can rotate about the first long support rod;

a visor bracket adapter that is formed as an open bottom box with two flanges extending from adjacent lateral sides of the box, wherein the box has a height that is half the length of the short support rod, wherein each flange has an elongated groove in its center;

a second automobile visor that is an opaque panel;

a second visor support rod formed by a second short support rod joined at one end to a second long support rod at an angle that is substantially perpendicular; wherein the second short support rod has a head opposite the end joined to the second long support rod;

a visor mounting bracket that receives the head of the second short support rods and has two openings for receiving screws;

wherein the head of the first short support rod is inserted into the open bottom of the box and allows the first visor support rod to rotate relative to the visor bracket adapter, a cover locks the head of the first short support rod and the compression spring to the box;

wherein the visor adapter bracket adapter is mounted to the visor mounting bracket by inserting a screw through one of the elongated grooves and one of the opening and inserting a second screw through the other of the elongated grooves and the other of the openings, the screws are secured to one of a driver's side and a passenger's side of an automobile.

2. The automobile visor system of claim 1, wherein an anchor shaped visor hanger is attached to the automobile and releaseably retains the first and second visor support rods.

3. The automobile visor system of claim 1, wherein the second automobile visor and the visor mounting bracket are existing factory visor and existing factory mounting bracket; respectively, and the second automobile visor mounts under the first automobile visor at existing factory location.

* * * * *